United States Patent [19]

Lawrence et al.

[11] 4,095,839
[45] Jun. 20, 1978

[54] FALLING OBJECT PROTECTIVE STRUCTURE

[75] Inventors: Dean Merrill Lawrence, Aurora; Gary Lee Popdan, Sandwich, both of Ill.

[73] Assignee: Caterpillar Tractor Co., Peoria, Ill.

[21] Appl. No.: 689,284

[22] Filed: May 24, 1976

[51] Int. Cl.$^2$ ............................................. B62D 27/00
[52] U.S. Cl. .............................. 296/28 C; 135/5 A; 214/DIG. 7; 296/102
[58] Field of Search ............... 296/137 R, 28 C, 102; 135/5 A; 187/97; 214/DIG. 7

[56] References Cited

U.S. PATENT DOCUMENTS

| 2,734,588 | 2/1956 | Schlumbohm | 296/137 R |
|---|---|---|---|
| 2,795,458 | 6/1957 | Wieschel | 296/28 C |
| 3,851,982 | 12/1974 | See | 296/102 |

Primary Examiner—Joseph F. Peters, Jr.
Assistant Examiner—John A. Carroll
Attorney, Agent, or Firm—Phillips, Moore, Weissenberger, Lempio & Majestic

[57] ABSTRACT

A falling object protective structure to protect the operator's cab of a hydraulic excavator or the like includes a canopy assembly mounted over the roof of the operator's cab which projects forward of the cab structure. The canopy is mounted on the cab structure at the front of the cab by a resilient member, whereby bending moments imparted to the canopy assembly by the impact of falling objects will not be transmitted to the cab structure. The protective structure is mounted directly to the top of the cab on the vertical support members inherent in the cab structure.

15 Claims, 7 Drawing Figures

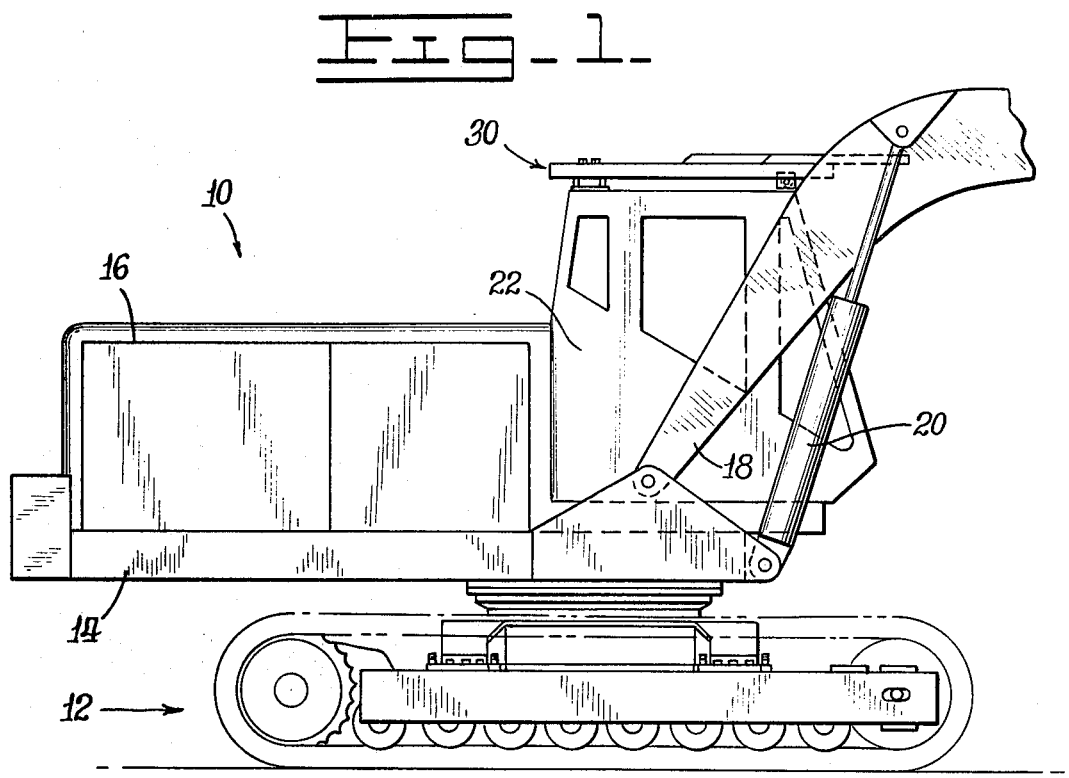
Fig_1_
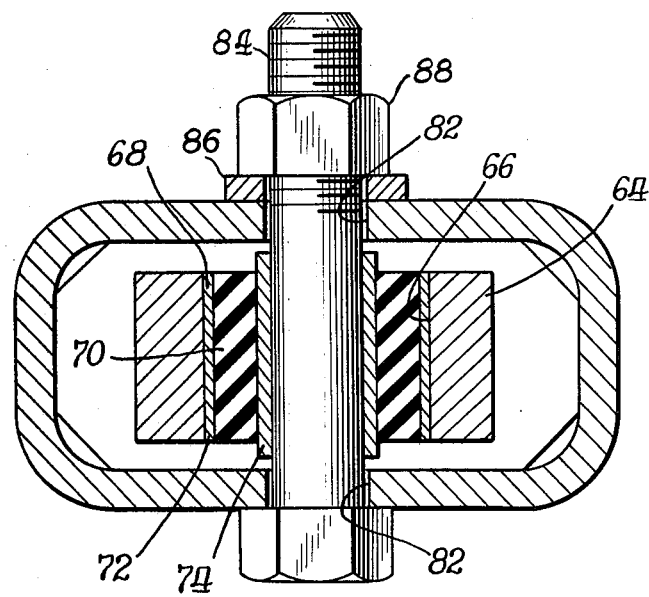
Fig_3_

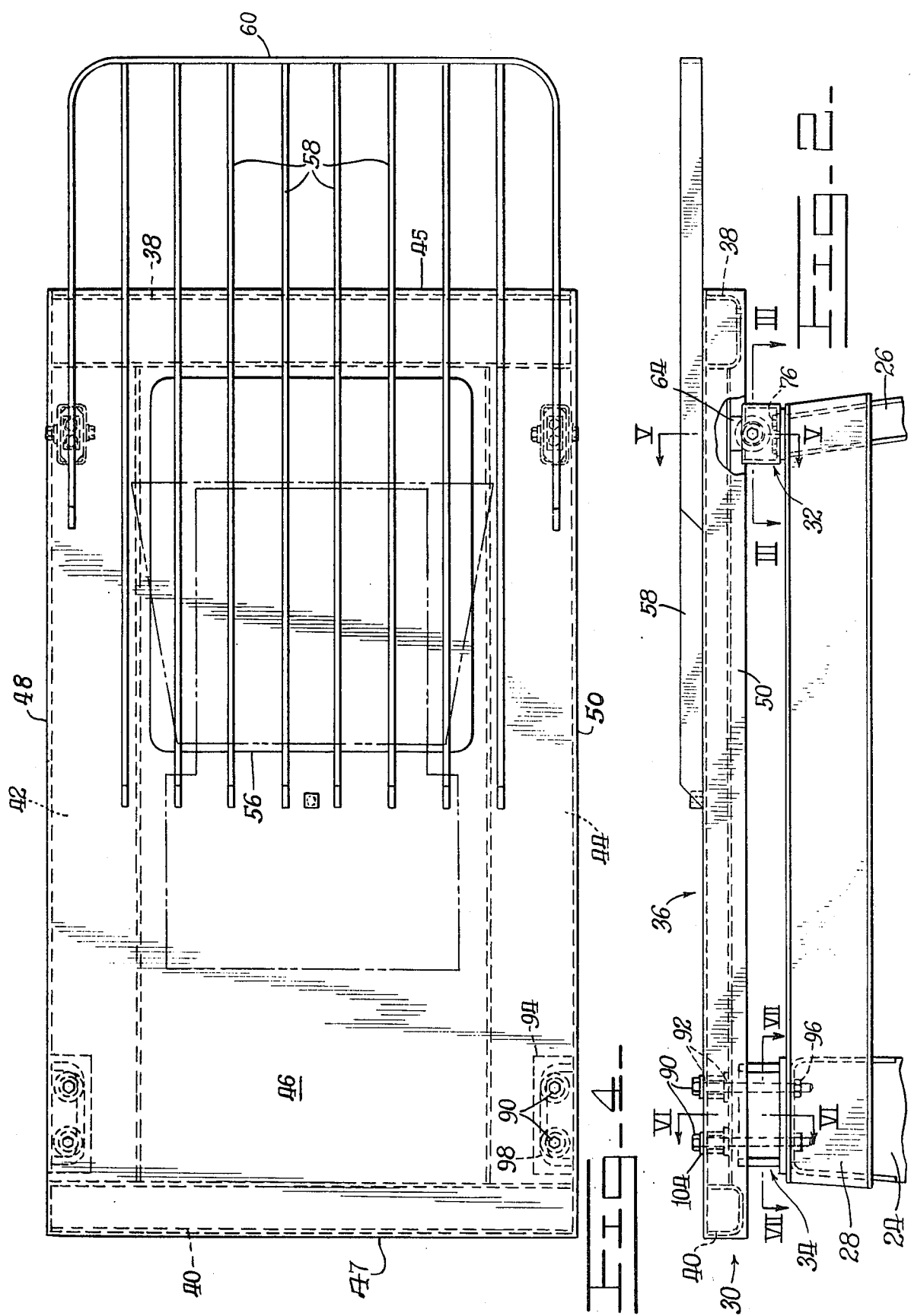

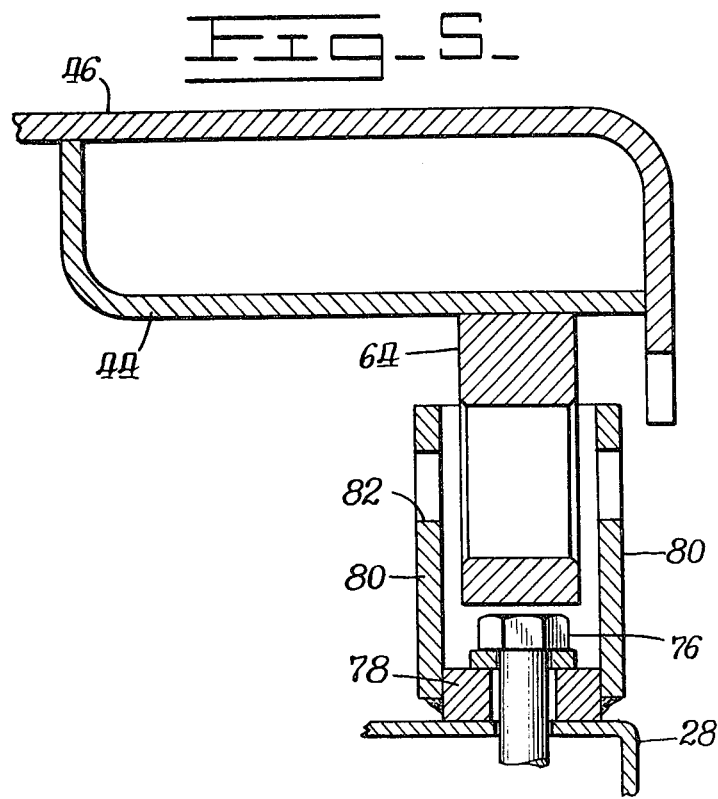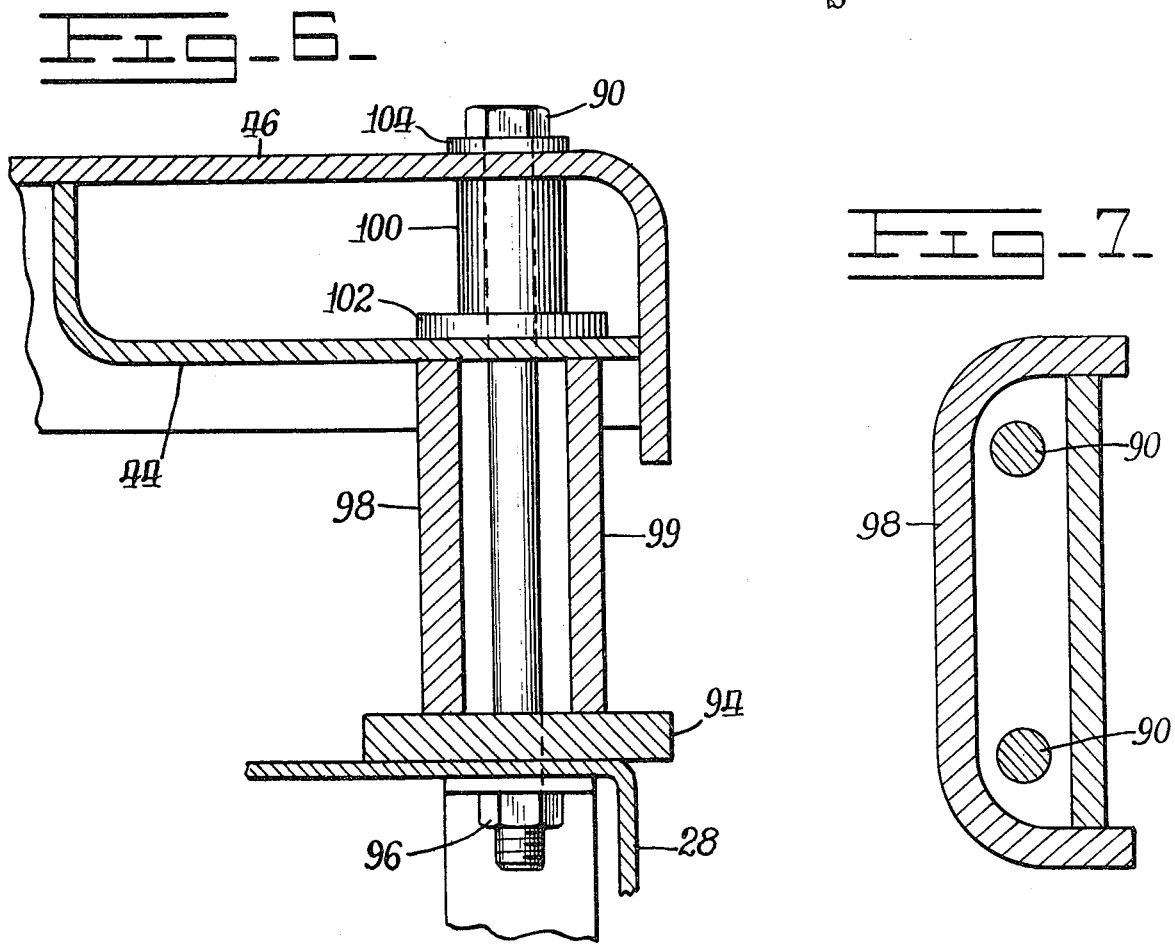

FALLING OBJECT PROTECTIVE STRUCTURE

BACKGROUND OF THE INVENTION

The present invention relates to the field of overhead protective structures for excavating machines such as hydraulic excavators and shovels to protect the machine and the machine operator from falling objects such as rocks and bolders dislodged during excavation operations. It is well known to provide protective structures for the top of such machines. However, since they may be subjected to high impact compressive forces and bending moments, such structures must be mounted on the machine frame by heavy mounting members sufficient to withstand such bending moments. The required heavy mounting members increase the weight and complexity of such protective structures and interfere with vision from the operator's cab.

SUMMARY OF THE INVENTION

It is an object of the present invention to provide a falling object protective structure for hydraulic excavators and the like that avoids the requirements for heavy support members extending from the main vehicle frame upward past the operator's station to the canopy assembly of the structure to improve visibility and eliminate the weight and complexity of such mounting structures. The foregoing objectives are realized in the present invention, which provides a protective structure including a canopy mounted on the top of the excavator operator's cab at the front and back thereof directly over the front and back vertical cab structure members to avoid imparting bending moments thereto. The mounting means at the front of the cab includes laterally resilient pivot means whereby bending moments imparted to the canopy assembly of the protective structure by the impact of falling objects will not be transmitted to the cab structure. Since the cab structure will not be subjected to such bending moments, it may be employed as an integral means for mounting the protective structure on the top of the cab, eliminating any requirements for heavy mounting members mounting the protective structure to the vehicle frame, and thus reducing weight, avoiding needless components and complexity of the machine and enhancing visibility from the operator's cab.

DESCRIPTION OF THE DRAWINGS

FIG. 1 is an elevational view of the portion of a hydraulic excavator showing a falling object protective structure embodying the present invention mounted thereon;

FIG. 2 is an enlarged view of the protective structure and extreme cab top shown in FIG. 1;

FIG. 3 is a sectional view of the front mounting means of the present invention taken along the line 3—3 of FIG. 2;

FIG. 4 is a top plan view of the protective structure of the present invention;

FIG. 5 is a sectional view of the front mounting means of the present invention taken along the line 5—5 of FIG. 2;

FIG. 6 is a sectional view of the rear mounting means of the present invention taken along the line 6—6 of FIG. 2; and FIG. 7 is a sectional view of the rear mounting means of the present invention taken along the line 7—7 of FIG. 6.

DETAILED DESCRIPTION OF THE PREFERRED EMBODIMENT

Referring to FIG. 1, a hydraulic excavator is shown at 10 as comprising an undercarriage assembly 12, a frame 14 pivotally mounted on the undercarriage assembly, an engine compartment 16 mounted on the frame, a boom 18 shown in fragment pivotally mounted on the frame and having a distal end, now shown, adapted for fitting with a digging implement such as a bucket, a boom jack 20 pivotally connected to the frame and the boom for actuation thereof, and an operator's cab 22 mounted on the frame and adapted for accomodation of the excavator operator and controls.

As shown in FIG. 2, cab 22 typically comprises upstanding support members 24 and 26 supporting a top 28 thereon. A falling object protective structure embodying the present invention is shown generally at 30 mounted on top 28 and comprises a front mounting means 32 attached to cab top 28 near the front thereof directly above upstanding support member 26, a rear mounting means 34 attached to top 28 near the rear thereof directly above upstanding support member 24, and a canopy assembly 36 mounted on said front and rear mounting means. The canopy assembly comprises front and rear U-shaped channel members 38 and 40, respectively, joined by side channel members 42 and 44. The plate 54 is a U-shaped member (50, 52 and 54 being all one piece) and does not have front and rear plates 45 and 47. The dashed lines in FIG. 4 represent the channel members 38 and 40, as shown in FIG. 2. The four channel members are covered on the top by a top plate 46 having downwardly extending side portions 48 and 50, as shown in FIG. 6, and a central opening 56 provided for upward visibility from the cab. A plurality of spaced parallel bars 58 are mounted on top plate 46 and extend forwardly thereof to a front bar 60 which may be an integral proportion of side bars 62.

The canopy assembly is mounted to the top of cab 22 at the front and rear thereof by front mounting means 32 and rear mounting means 34, respectively, on each side of the cab. The front mounting means includes brackets 64 which depend from channel members 42 and 44, and have a bore 66 provided therein. Fitted within bore 66 is a bushing assembly 68 which comprises a rubber bushing 70 having outer and inner sleeves 72 and 74 at the outer and inner diameters thereof, respectively. Attached to the top of cab 22 by means of bolts 76 is a plate 78 to which is welded an upstanding rectangular bracket 79 having parallel walls 80 arranged on each side of depending bracket 64 and having coaxial bores 82 disposed therein in alignment with the axis of inner sleeve 74. Brackets 64 and 78 are joined by a bolt 84 secured by a washer 86 and a nut 88. Thus, front mounting means 32 provides for pivotal resilient connection of the canopy assembly to the cab at the front thereof.

At the rear of the cab the canopy assembly is attached to the cab by means of bolts 90 which extend through suitable holes 92 provided in channel members 42 and 44, through plates 94 provided on the top of the cab and through cab top 28 where they are secured by nuts 96. U-shaped members 98 extend between plates 94 and channel members 42 and 44 for suitable spacing of the canopy assembly from the cab top. Front plates 99 complete the enclosure of bolts 90. Spacers 100 and washers 102 are provided on bolts 90 between top 46 and channel members 42 and 44, and additional washers 104 are provided on top of the assembly.

Since the front and rear mounting means of the present invention are provided on the cab top directly above the front and rear upstanding cab top support members, vertical forces imparted to the protective structure of the present invention will not cause any shear or bending moments in the cab top.

Moreover, if bending moments are imparted to the canopy assembly by the impact of falling objects, the canopy assembly is allowed to pivot around bolts 84 preventing the bending moments from being transmitted to the structure of cab 22. Resilient bushing assembly 68 allows transverse displacement of bolts 90 during bending of the canopy assembly to further prevent bending moments in the structure of cab 22.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A falling object protective structure for hydraulic excavators or the like having an operator's cab which includes generally vertical support members and a top mounted on said support members, comprising:
   a canopy assembly adapted for disposal over an excavator operator's cab and extending forwardly thereof;
   rear mounting means for mounting the canopy assembly to an excavator cab at the rear thereof; and
   front mounting means for attachment of the canopy assembly to an excavator cab at the front thereof, and wherein said front mounting means includes pivot means for allowing pivoting of the canopy assembly with respect to portions of said front mounting means and an excavator cab to which such portions are affixed upon vertical loading of the canopy whereby the canopy assembly may pivot under such loading to avoid bending moments at said front mounting means.

2. The falling object protective structure defined in claim 1 wherein said front mounting means also includes resilient means for allowing limited transverse displacement of the pivot means with respect to the rear mounting member upon bending of the canopy assembly to reduce longitudinal loading of the front mounting means.

3. The protective structure defined in claim 1 wherein said front mounting means comprises first bracket means depending from said canopy assembly, second bracket means adapted for attachment to the cab and bolt means pivotally connecting said first bracket means to said second bracket means.

4. The protective structure defined in claim 3 further comprising resilient bushing means disposed in one of said bracket means about said bolt means for allowing limited transverse displacement of one of said bracket means with respect to the other of said bracket means.

5. The falling object protective structure defined in claim 1 wherein said rear mounting means comprises spacer means for spacing the canopy assembly from the rear cab, and bolt means for securing the canopy assembly to the rear of the cab.

6. The falling object protective structure defined in claim 1 wherein the canopy assembly comprises spaced parallel front and rear transverse channel members, spaced parallel side channel members joining said front and rear channel members, a top plate disposed on top of said front and rear channel members and side channels extending therebetween, and a plurality of spaced parallel bars disposed on the plate member and extending forwardly thereof.

7. The protective structure defined in claim 6 wherein said mounting means are mounted on said spaced parallel side channel members and depend therefrom.

8. In combination with an excavator including an undercarriage assembly, a frame mounted on the undercarriage assembly, and a cab mounted on the frame and having generally upright support members and a top mounted on said support member, a falling object protective structure for preventing falling objects from striking the cab or the operator thereof, comprising:
   rear mounting means secured to the top of the cab at the rear thereof;
   front mounting means secured to the top of the cab at the front thereof; and
   a canopy assembly mounted on said rear and front mounting means covering said cab and extending forwardly thereof, and wherein said front mounting means includes pivot means whereby, upon bending of the canopy assembly from a bending moment resulting from the impact of a falling object, the canopy assembly may pivot at said front mounting means with respect to the cab whereby said bending moment in the canopy assembly will not be transmitted to the cab structure.

9. The invention defined in claim 8 wherein said front mounting means is affixed to the cab top above upright support members whereby vertical forces imparted to the cab top by said front mounting means will not cause bending moments in the cab structure.

10. The invention defined in claim 8 wherein said rear mounting means are affixed to the cab top above upright support members whereby vertical forces imparted to the cab top by said rear mounting means will not cause bending moments in the cab structure.

11. The invention defined in claim 8 wherein said front mounting means includes resilient means for allowing limited transverse displacement of said canopy assembly with respect to the cab top at said front mounting means upon bending of the canopy assembly.

12. The invention of claim 8 wherein said front mounting means comprises a first bracket depending from the canopy assembly, a second bracket affixed to the cab top, coaxial bore means provided in said first and second brackets, and bolt means disposed in said bore means and securing said first and second brackets in pivotal relationship.

13. The invention of claim 12 wherein one of said brackets includes portions disposed adjacent opposing sides of said other bracket whereby a vertical force on said first bracket will not cause bending moments in said second bracket.

14. The invention of claim 12 wherein said front mounting means includes resilient bushing means disposed within said bore means and about said bolt means.

15. The invention of claim 14 wherein said resilient bushing means comprise a first sleeve disposed within the bore means in said first bracket, a second sleeve disposed on said bolt means, and a cylindrical rubber bushing disposed concentrically between said first and second sleeves.

* * * * *